United States Patent

Worzella

[11] Patent Number: 5,551,923
[45] Date of Patent: Sep. 3, 1996

[54] SIMULATED ARTICULATED BIRD WITH WIND ACTIVATED WING FLAPPING APPARATUS

[76] Inventor: Ronald A. Worzella, 35128 Hwy PP, Plymouth, Wis. 53073

[21] Appl. No.: 982,488

[22] Filed: Nov. 27, 1992

[51] Int. Cl.[6] .................................................. A61F 31/02
[52] U.S. Cl. ........................ 472/137; 428/16; 416/9; 416/10
[58] Field of Search ................... 428/16; 244/72; 446/35; 416/9, 10; 73/170.01, 170.05, 170.07; 472/137

[56] References Cited

U.S. PATENT DOCUMENTS

| | | | |
|---|---|---|---|
| 547,553 | 10/1985 | Keller | 428/16 X |
| 1,652,775 | 12/1927 | Funk et al. | 428/16 X |
| 2,061,189 | 11/1936 | Dungan | 73/55 |
| 2,704,908 | 3/1955 | Lamkin | 46/53 |
| 2,704,909 | 3/1955 | Lamkin | 46/53 |
| 3,220,253 | 11/1965 | Parker | 73/170.07 |
| 3,435,550 | 4/1969 | Carlson | 43/3 |
| 4,244,138 | 1/1981 | Holahan | 46/124 |
| 5,144,764 | 9/1992 | Peterson | 43/3 |

Primary Examiner—Richard Chilcot
Assistant Examiner—Joseph L. Felber
Attorney, Agent, or Firm—Robert T. Johnson

[57] ABSTRACT

Disclosure is made in this application of apparatus to synchronize and change the pitch of wind actuated flapping wings of a simulated bird.

4 Claims, 5 Drawing Sheets

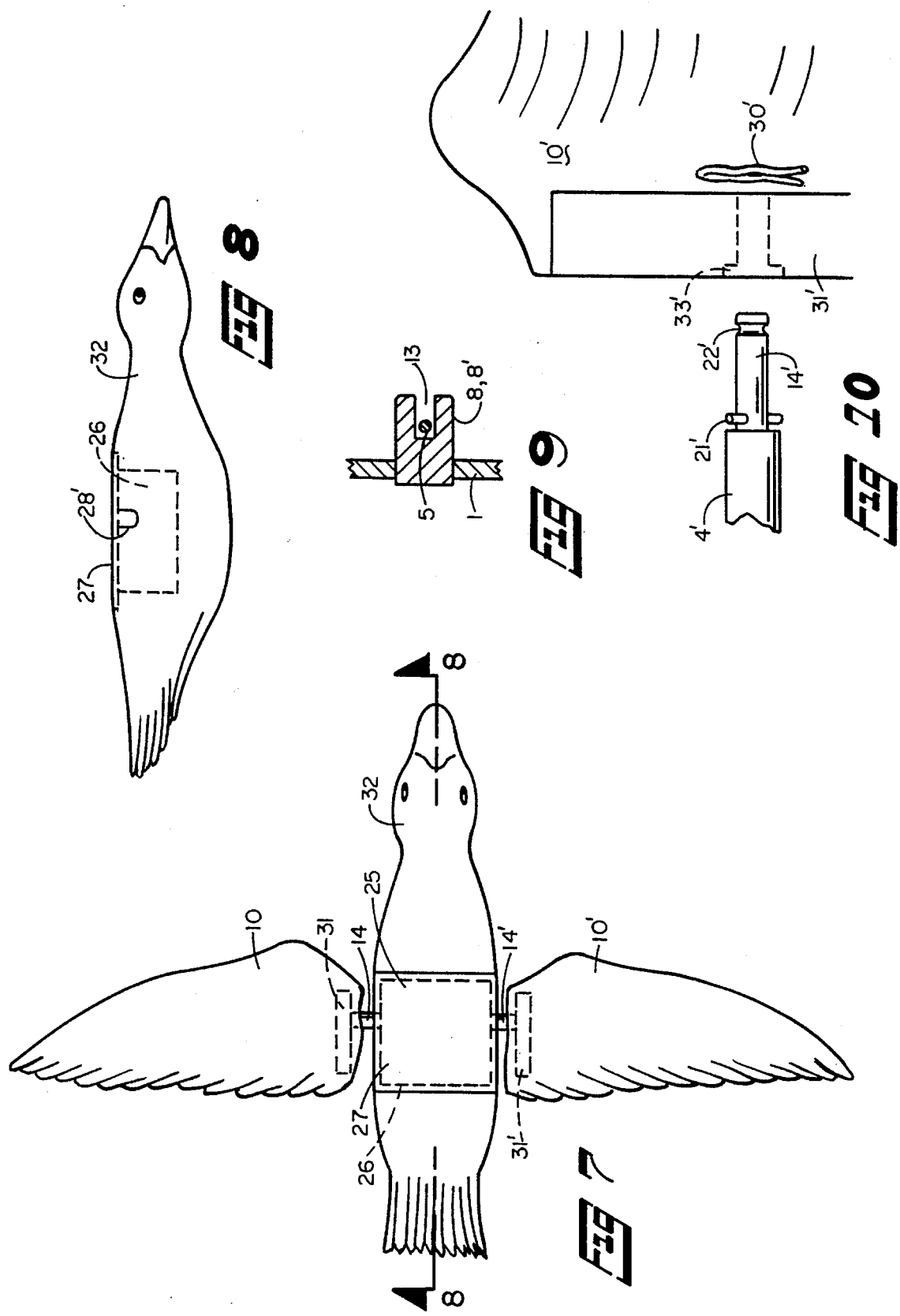

SIMULATED ARTICULATED BIRD WITH WIND ACTIVATED WING FLAPPING APPARATUS

FIELD OF THE INVENTION

This invention relates to a simulated bird, such as a goose, duck, crow, or other birds and having apparatus that flaps the wings and changes wing pitch in the up and down movement, when actuated by a wind on being mounted out of doors as a decoration or as a weather vane.

PRIOR ART

To date simulated birds may or may not have articulated wings, and those that have such wings may be such as disclosed in:

U.S. Pat. No. 2,061,189 to Dungan for Weather Vane.—This patent discloses wind activated wings, which merely flap up and down as joined to interconnected gears.

U.S. Pat. No. 2,704,908 to Lemkin for Artificial Birds—Disclosure is made in this patent of a bird body and wings pivotally mounted thereon and movable weights in the wings to flap the wings. The wings are joined by means of a universal joint.

U.S. Pat. No. 3,220,253 to Parker for Weathervane And Wind Velocity Indicator. This patent discloses wings actuated by wind acting on a propeller, the shaft of which is connected by gears to the base of the wings.

U.S. Pat. No. 3,435,550 to Carlson for Decoy.

U.S. Pat. No. 4,244,138 to Holahan for Animated Toy Bird. Disclosure is made of trigger actuated wings.

U.S. Pat. No. 5,144,764 to Peterson for Decoy With Wind Actuated Wings. Disclosure is made of floppy wings to fluctuate in response to airflow.

None of the above prior patents disclose the invention claimed in this application of apparatus to change the pitch of the flapping or modified undulating wings.

SUMMARY OF THE INVENTION

The apparatus of this invention comprises an apparatus for synchronizing the flapping of the wings of a simulated bird, and further to change the pitch of the wings in the up position from the pitch in the down position. The apparatus comprises wing mount axles interconnected with each other to be synchronized in their up and down flapping and further synchronized to change the pitch such that the leading edges of the wings are tilted upwards, and trailing edges of the wings are tilted downward when the wings are in the down flap.

An object of this invention is to disclose a simulated bird having apparatus for synchronized, flappable, variable pitch wings each wing attached to wing mount axle and each axle extending from assembled wing flapping apparatus mounted in the midsection of a simulated bird, and means for changing the pitch of the wings having the wing mount axles attached to wing pitch actuating cams and the cams actuated by a formed spring wire shaped like three sides of a rectangle having a base and two arms extending therefrom and the base of this formed wire fitting in slots in slotted spring wire guides and leg end balls on the end of each arm of the formed spring wire fitting in respective dimple socket mount in actuating cams and the cams to pivot on a wing mount bearing axle extending through the wing bearing mount block for each wing and the bearing mount blocks rotate on the axle of the wing bearing mount block and means to synchronize the flapping wings by a connector arm from top of left wing bearing mount block to bottom of right wing bearing block, and a tension spring connecting the left and right wing bearing mount blocks by means of attaching the tension spring to pins located on the top of each of the left and right wing bearing mount blocks.

Disclosure is also made of U shaped slots on the right and left sides of the simulated bird to allow for the wing axle movement on activation of flapping of the wings.

BRIEF DESCRIPTION OF DRAWINGS

FIG. 7 Plan view of simulated bird and wing mount apparatus in place.

FIG. 8 Side elevation cut away view on line 8—8 of FIG. 7 showing wing mount apparatus in position.

FIG. 9 Magnified slotted spring wire guide and slot along section line 9—9 in FIGS. 1 & 5.

FIG. 10 Detail of wing base mount to wing mount axle.

DETAILED DESCRIPTION OF DRAWING LEGENDS

1—Rear wall bracket
2,2'—Base runners.
3,3'—Wing bearing mount blocks.
4,4'—Wing mount axle bearing.
5—Formed spring wire.
6,6'—Wing pitch actuating cam.
7—Tension spring. (counter balance spring).
8,8'—Slotted spring wire guides.
9—Front wall bracket.
10,10' Wings.
11,11' Bearing bushings.
12,12' Stop slots.
13,13' Horizontal slots in slotted spring wire guides.
14,14' Wing mount axle.
15,15' Mount pins for end of tension spring.
16,16' Slot in wing pitch actuating cam.
17,17' Cam slot stop pin attached to wing bearing mount block.
18—Connector arm from top of left wing bearing mount block to bottom of right wing bearing block.
19,19' Spacer washer.
20,20' Axle of wing bearing mount block.
21,21' Wing mount axle pin.
22—Groove in wing mount axle.
23,23' End legs of connector arm 24,24' Dimple socket mounts in actuating cams.

25—Assembled wing flapping apparatus.

26—Space in simulated bird for mounting wing flapping apparatus.

27—Cover over space for wing mount apparatus.

28—U space for up and down movement of wing mount axle.

29,29' Leg end balls on end of formed spring wire.

30,30' Hairpin clips.

31,31' Wing mount beams.

32—Simulated bird.

33,33' Slots in wing mount beams.

It is to be pointed out that in general the left and right sides of the apparatus are mirror images of each other thus the legend numbers with a prime (') indication are on the right side of the apparatus and are like components as the same numbers without a prime indication.

DETAILED DESCRIPTION OF INVENTION
(Preferred embodiment)

Figure 1:
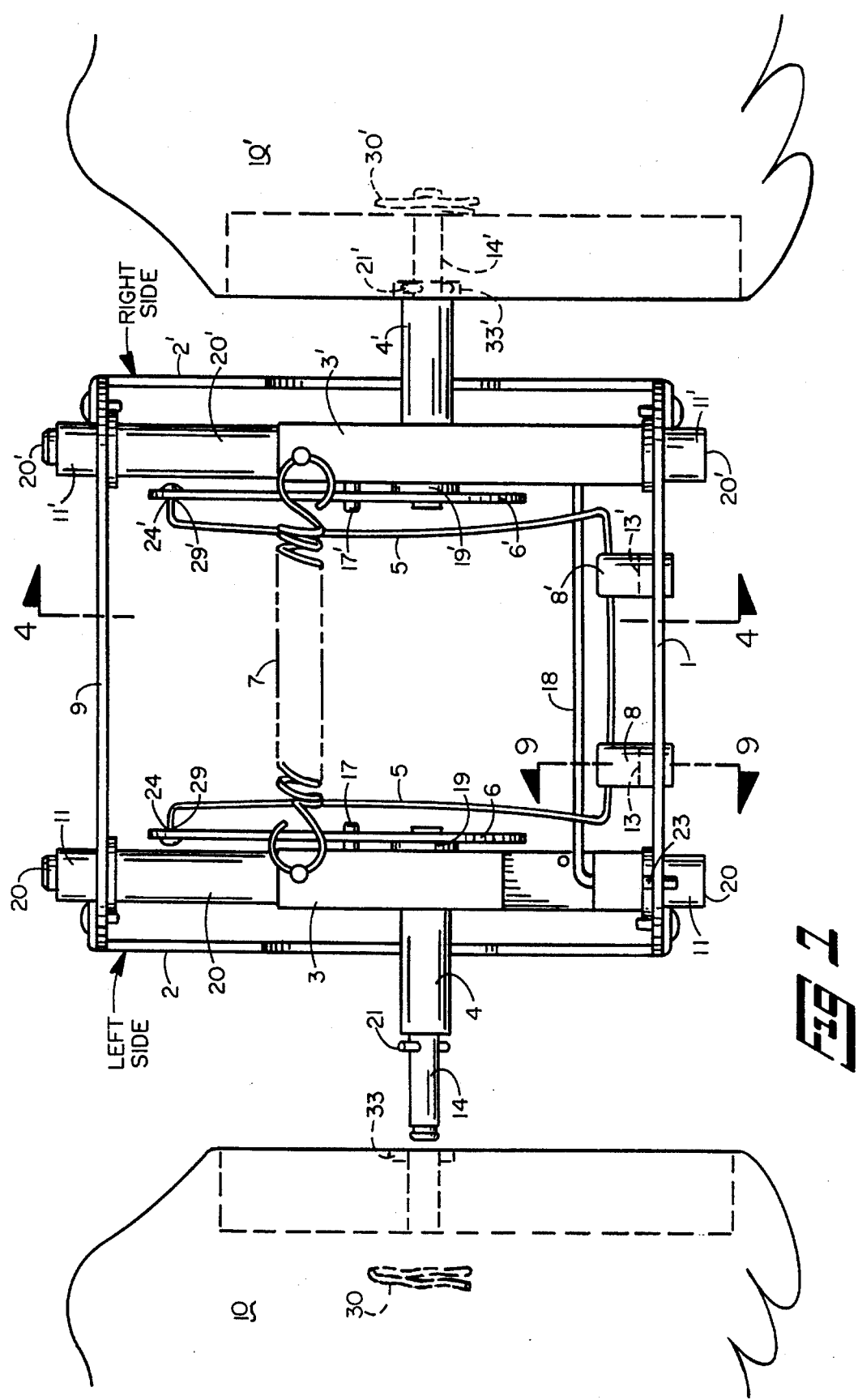
FIG. 1 Plan view of wing mount apparatus.
Figure 2:
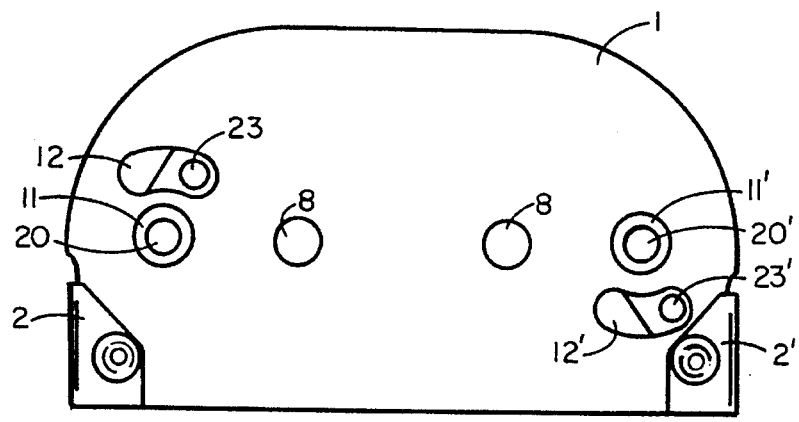
FIG. 2 Rear elevation view of wing mount apparatus.
Figure 3:
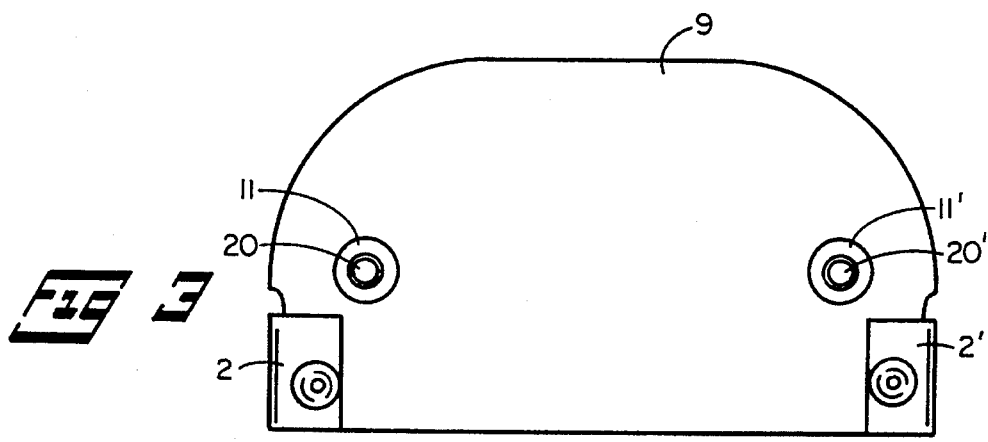
FIG. 3 Front elevation view of wing mount apparatus.
Figure 6:
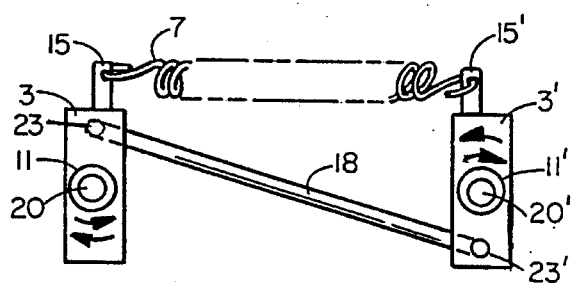
FIG. 6 Elevation view on section line 6—6 of the FIG. 5 showing connector rod between wing bearing mount blocks.

This invention is for a simulated bird 32, with wings 10,10' that flap on being activated by a wind, and further in the flapping action, the pitch of the wings are changed to elevate the leading edge of the wings at the bottom of the down flap and at the top of the up flap the leading edges of the wings are lowered. Thus when the wings are flapped to the "up" position the leading wing edge is pitched downward, and when the wings are flapped to the "down" position the leading wing edges are pitched upward The apparatus of the assembled wing flapping apparatus 25, which includes changing of the pitch of the wings 10,10' includes a rear wall bracket 1, and a front wall bracket 9, each bracket connected to base runners 2,2', to form the frame of the complete apparatus 25. Wing bearing mount blocks 3,3' having axles 20, 20' of wing bearing mount block mounted in bearing bushings 11,11' on rear wall bracket 1 and front wall bracket 9, and wing pitch actuating cams 6,6' are attached to its respective wing mount axle 14,14' are rotatable in, and extend through wing mount axle bearings 4,4' each in its respective wing bearing mount blocks 3,3' and formed spring wire 5, in the configuration of three sides of a rectangle, with the base of the spring wire 5 mounted in horizontal slots 13,13' in slotted spring wire guides 8,8' which guides 8,8' are firmly mounted on inner side of rear wall bracket 1, and the leg end balls 29,29' of the three sided rectangle formed spring wire 5 are inserted and pivotally mounted in dimple socket mounts 24,24' in wing pitch actuating cams 6,6'. In each wing pitch actuating cam 6,6' there is an arc slot 16,16' and this slot serves to limit the pivoting of cams 6,6', by means of cam slot stop pins 17,17' attached to the wing bearing mount blocks 3,3'. The wing bearing mount blocks 3,3' are connected to each other by means of one end of connector arm 18 pivotally mounted on the top of left wing bearing mount block 3 and the other end of connector arm 18 pivotally mounted on the bottom of right bearing mount block 3'. The wing bearing mount blocks 3,3' are pivotally mounted for rotational movement (see FIG. 6) and such rotation is limited by means of end legs 23,23' of connector arm 18, each leg mounted in its respective wing bearing mount block 3,3' and these end legs extend into arc stop slots 12,12' (see FIG. 2). Tension spring 7, is connected to mount pins 15,15' mounted on the top of wing bearing mount blocks 3,3' and thus the wing mount axles 14,14' are at a neutral, or midpoint of neither up or down of the flapping wings 10,10'.

The wing mount axle 14,14' is rigidly attached on one end to its respective wing pitch actuating cam 6,6' and this axle extends through and is rotatable in wing mount axle bearing 4,4', of the wing bearing mount blocks 3,3', and the wing mount axles 14,14' extend outward for mounting of the wings 10,10' by means of wing mount axle pins 21,21' fitting into a slots 33', in wing mount beams 31', and a hairpin clip 30' fitting onto a groove 22' in each wing mount axle 14,14', such that the wing mount beam 31' is between the axle pins 21',21' and hairpin clip 30. On mounting of the wing bearing mount blocks 3,3' the axles 20,20' are mounted in bushings or bearings which bearings may be a plastic such as for example nylon. Spacer washers 19,19' are mounted on wing mount axle 14,14' between wing pitch actuating cams 6,6' and wing bearing mount blocks 3,3'. The above described assembled apparatus 25, for wing pitch changing and wing flapping is inserted in simulated bird 32 in space 26 of the simulated bird as shown in FIG. 8 (elevation view) and a cover 27 over the space for the wing mount apparatus. In order for the wings 10,10' mounted on the wing mount axles 14,14' to flap up and down in the wind there are "U" shaped space slots 28, one on each side of the of the simulated bird 32, (see FIG. 8) to allow for up and down movement of the wings.

Further, disclosure of the invention can be described as a simulated bird 32, having assembled wing flapping apparatus 25, for synchronized, flappable, variable pitch wings 10,10' and each wing attached to its respective wing mount axle 14,14' and each such axle extending from assembled wing flapping apparatus 25, mounted in the midsection in space in simulated bird for mounting wing flapping apparatus 26, and meads for changing the pitch of the wings having the wing mount axles 14,14' attached to wing pitch actuating cams 6,6' and the cams actuated by a formed spring wire 5 shaped like three sides of a rectangle having a base and two arms extending therefrom, and the base of this formed wire 5 fitting in slots 13,13' in slotted spring wire guides 8,8' and leg end balls 29,29' of each arm of this formed spring wire 5 fitting in dimple socket mounts 24,24' in actuating cams 6,6' and these cams 6,6' to pivot on wing mount bearing axles 14,14' extending through its respective wing bearing mount block 3,3' for each wing 10,10' and the wing bearing mount blocks 3,3', rotate on the axle 20,20' of the wing bearing mount blocks and means to synchronize the flapping wings 10,10' by a connector arm 18 rotatably attached at each end of this arm one end so attached to the top of left wing bearing mount block 3, and the other end of the connector arm 18 rotatably attached to the bottom of right wing bearing mount block 3', and a tension spring 7 connecting the left 3 and right 3' bearing mount blocks by means of attaching the tension spring 7 to mount pins 15,15' located on the top of each of the left 3, and right 3' wing bearing mount blocks.

In the above description of this invention it is to be pointed out that in the wing flapping and pitch change apparatus the right side is a mirror image of the left side except for connector arm 18 which is rotatably attached to the top of left wing bearing mount block 3, while the opposite end of this connector arm 18 is rotatably attached to the bottom of the right wing bearing mount block 3', so that the wings are always synchronized in the flapping and change of pitch.

Figure 11:
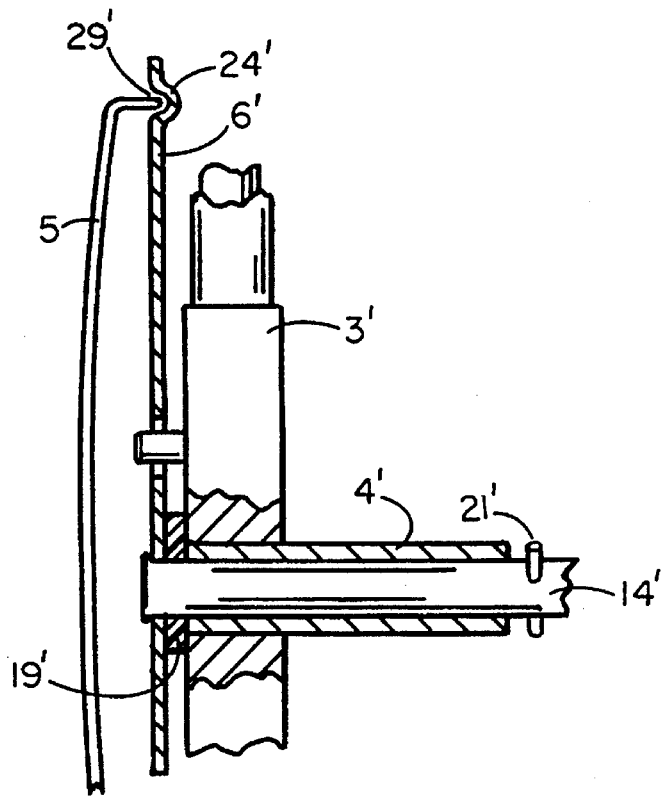
FIG. 11 Enlarged expanded cross section plan view of leg end ball of formed spring wire arm and dimple socket mount in actuating cam.
Figure 12:
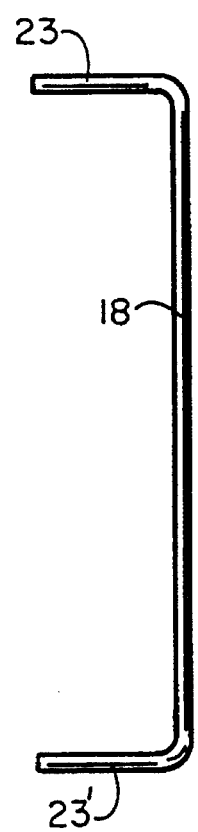
FIG. 12 Connector arm and end legs thereof.

To further describe the invention, wing pitch actuating cams 6,6' are attached to the formed spring wire 5, by means of leg end balls 29,29' on ends of each formed spring wire arm 5 and the leg end balls 29,29' extending outward at approximately right angles to the arms of formed spring wire 5, and the leg end balls 29,29' fitting into dimple socket mounts 24,24' in each respective actuating cam 6,6' The FIG. 11 shows an expanded magnified view of a leg end ball 29' and dimple socket mount 24' in actuating cam 6'. The above discussion is in the plural, while the FIG. 11 shows a singular fitting which would be duplicated on the opposite side of the apparatus.

The leg end balls 29, 29' can best be described as including merely rounded ends to fit in the dimple socket mounts 24,24'.

Figure 4:
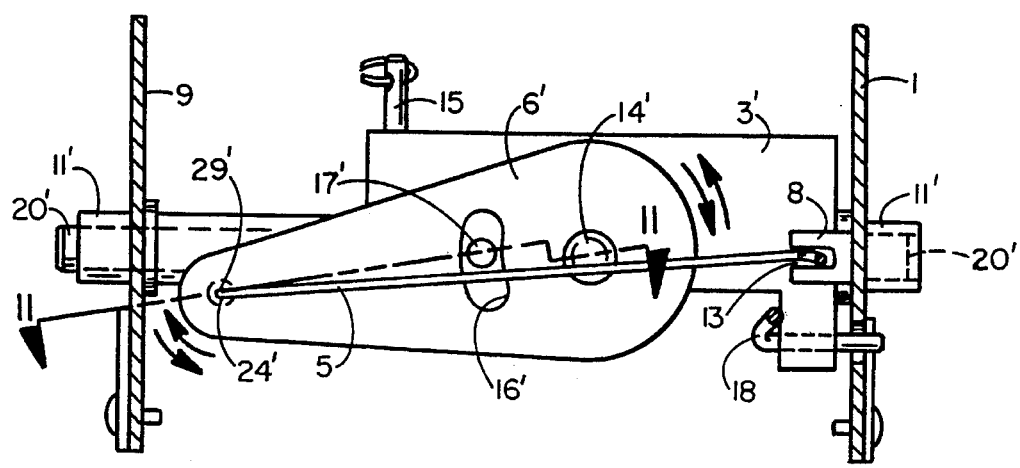
FIG. 4 Right side elevation view on section line 4—4 of the FIG. 1.
Figure 5:
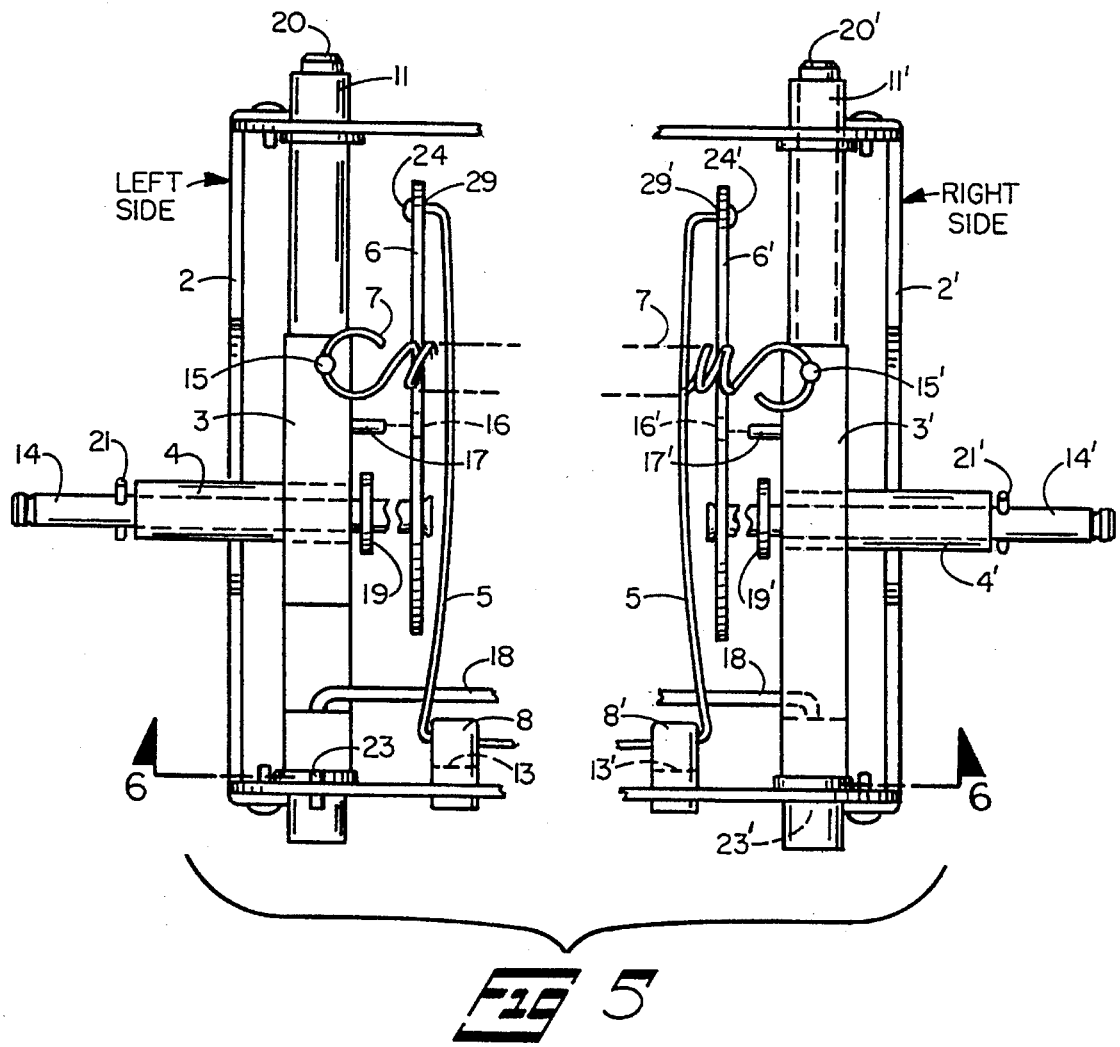
FIG. 5 Expanded plan view of wing mount apparatus.

Referring now to FIG. 4, for best operation of this apparatus each cam slot stop pin 17,17' attached to its respective wing bearing mount block 3,3' is to be in horizontal plane with its respective wing mount axle 14,14' and axles 20,20' of wing bearing mount blocks 3,3'. This FIG. 4 illustrates the above in regard to the right side of the assembled wing flapping apparatus 25. The left side is a mirror image of the right side.

The said wing bearing mount blocks 3,3' rotate on axles 20,20' of said wing bearing mount blocks 3,3' and means to synchronize wind activated flapping wings 10,10' by means of a connector arm 18 extending from the top of the wing bearing mount block 3 on the left side to bottom of the wing bearing mount block 3' on the right side and each of the two legs 23,23' of the connector arm 18 extending into its respective wing bearing mount block 3,3' and further into a stop slot 12,12' for each end leg 23,23' of the connector arm 18 and a tension spring 7 connecting mount pins 15,15' located on the top surface of each of wing mount bearing mounts 3,3'.

To synchronize flapping of the wings 10,10' a connector arm 18 rotatably attached on one end to the top of the wing bearing mount block 3 on the left side, and the opposite end of the connector arm 18 rotatably attached to the bottom of the right side wing bearing mount block 3' and the connector arm 18 attached to the wing bearing mount blocks 3,3' on left and right sides by means of end legs 23,23' on the connector arm 18 and each end leg 23,23' of the connector arm 18 extending into respective wing bearing mount block 3,3' and extending further into stop slots 12, 12' located in rear wall bracket 1, to limit rotation of wing bearing mount blocks 3,3' and, a tension spring 7 connecting the left and right side wing bearing mount blocks 3,3'. The spring 7, spans from the left to the right wing bearing mount blocks 3,3' and is attached to mount pins 5,5' anchored in its respective wing mount bearing block.

In the description of this invention, the word "swivel" or derivatives thereof can be substituted for the word "rotatable", or derivatives thereof, to better identify the invention.

Having described my invention I claim:

1. As an article of manufacture a simulated articulated bird with wind activated wing flapping apparatus wherein the improvement comprises;

a—a pair of flappable variable pitch wings, each wing mounted on a separate wing mount axle and b—each said axle extending outward from assembled wing flapping apparatus mounted in the midsection of said simulated bird, c—and means for changing the pitch of said wings, said means comprising said wing mount axles attached to wing pitch actuating cams and said cams actuated by a formed spring wire for said cams to pivot on a wing mount axle bearing extending through wing bearing mount blocks and, d—said formed spring wire having a base inserted in horizontal slots in slotted spring wire guides mounted on a rear wall bracket and, e—a ball end on ends of said formed spring wire and each said ball end fitting into dimple socket mounts in said cams and f—said wing bearing mount blocks rotate on axles mounted in bearing bushings in rear wall bracket and front wall bracket of said wing bearing mount blocks and means to synchronize flapping wings by means of a connector arm extending from the top of said wing bearing mount block on the left side to the bottom of said wing bearing mount on the right side and each of the two legs of said connector arm extending into its respective wing bearing mount block and further into a stop slot for each said end leg of said connector arm and g—a tension spring connecting mount pins located on the top surface of wing mount bearing mounts.

2. As an article of manufacture a simulated bird with wind activated wing flapping apparatus of claim 1 wherein the improvement comprises;

a—each wing attached to its respective wing axle, and each said axle extending from said apparatus mounted in a midsection space in said simulated bird and b—means for changing the pitch of said wing mount axles comprising said wing mount axles attached to wing pitch actuating cams, and said cams actuated by attachment to a formed spring wire, said formed spring wire being similar to three sides of a rectangle having a base and two arms extending therefrom and slots in said cams and cam slot stop pins attached to wing bearing mount blocks and said pins extending into said slots in said cams and, c—said base of said formed spring wire fitting in slots in spring wire guides said spring wire guides mounted on the rear wall bracket and leg end balls on each end of said formed spring wire and said leg end balls fitting in its respective dimple socket mounts in said actuating cams, and said cams to pivot on wing mount axle bearing extending through its respective wing bearing mount for each wing, and each said wing bearing mount blocks rotate on an axle of said wing bearing mount blocks mounted in bearing bushings in rear wall bracket and front wall bracket and, d—synchronizing flapping of said wings by means of a connector arm rotatably attached on one end to the top of said wing bearing mount block on the left side, and the opposite end of said connector arm rotatably attached to the bottom of the right side of said wing bearing mount block and said connector arm attached to said wing bearing mount blocks on left and right sides by means of end legs on said connector arm and each said end leg of said connector arm extending into respective said wing bearing mount block and extending further into stop slots to limit rotation of said wing bearing mount blocks and, e—a tension spring connecting said left and right side wing bearing mount blocks.

3. As an article of manufacture a simulated articulated bird with wind activated wing flapping apparatus of claims 1 or 2 wherein the improvement comprises;

a—formed spring wire having a shape of three sides of a rectangle and having a base and two arms extending therefrom and b—leg end balls on ends of each of said arms and c—said leg end balls extending outward at approximately right angles to said arms and, d—said leg end balls fitting into dimple socket mounts in said actuating cams.

4. As an article of manufacture a simulated bird with wind activated wing flapping apparatus of claim 1 wherein the improvement comprises;

U shaped slots on the right and left sides of said simulated bird, to allow for wing axle movement on flapping of the wings.

* * * * *